Figure 18:
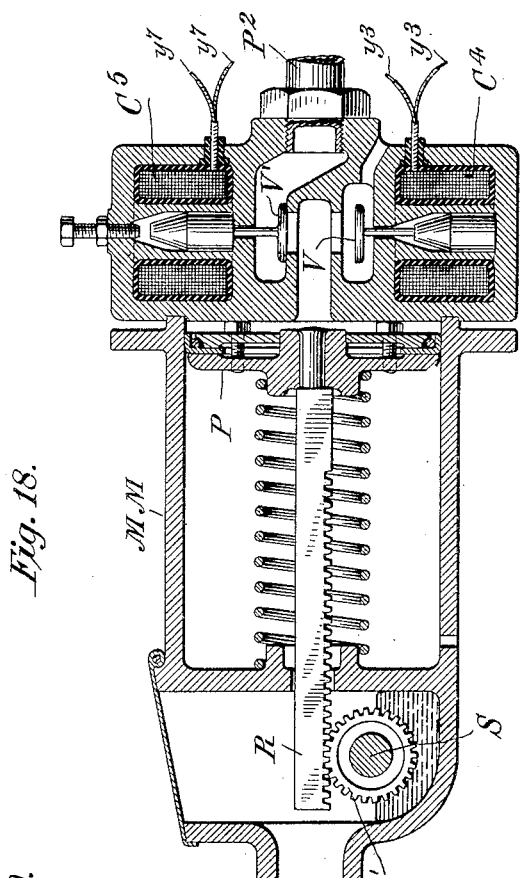

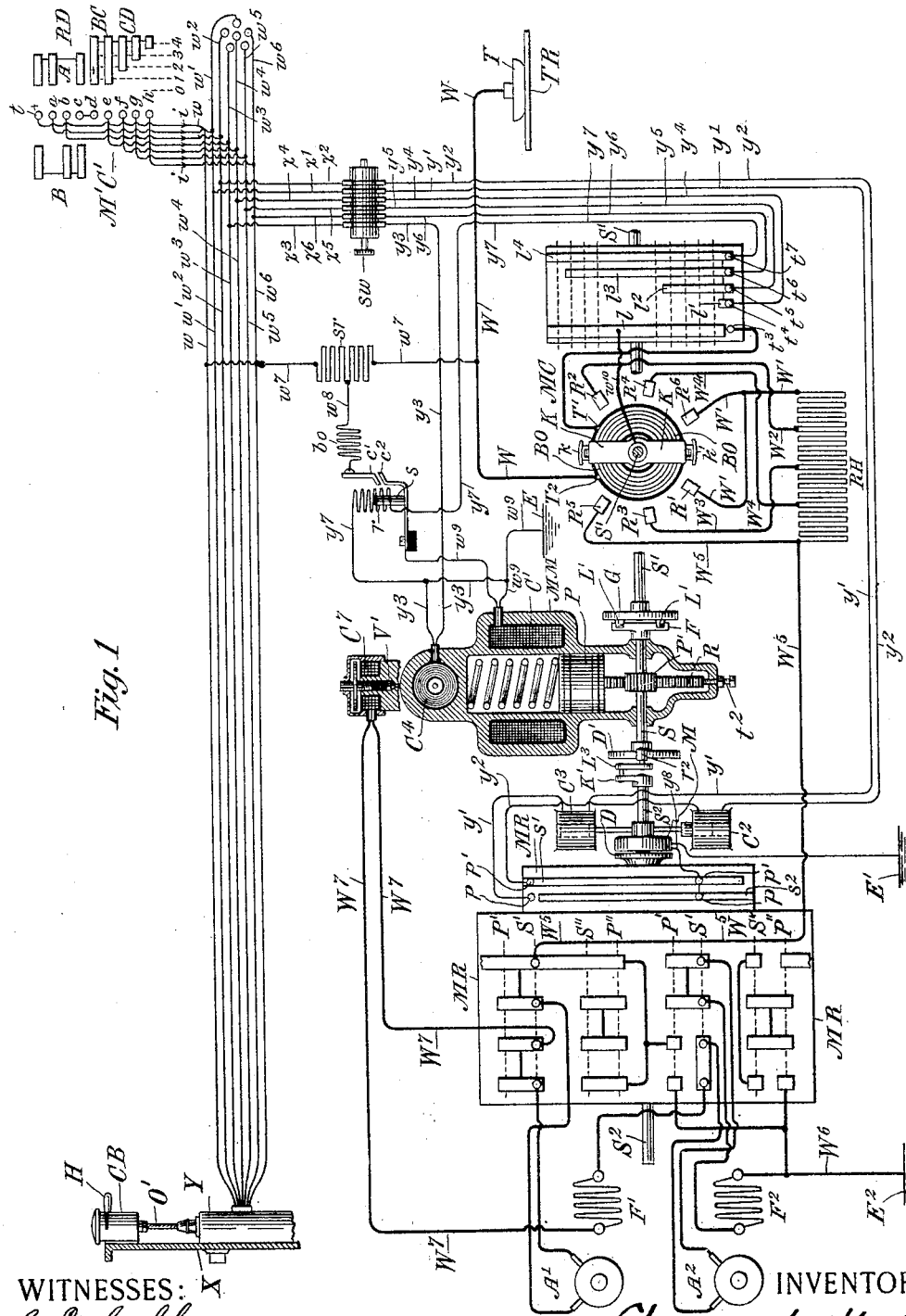

No. 804,156. PATENTED NOV. 7, 1905.
C. A. MUDGE.
SYSTEM OF ELECTRIC MOTOR CONTROL.
APPLICATION FILED MAR. 2, 1905.
7 SHEETS—SHEET 2.
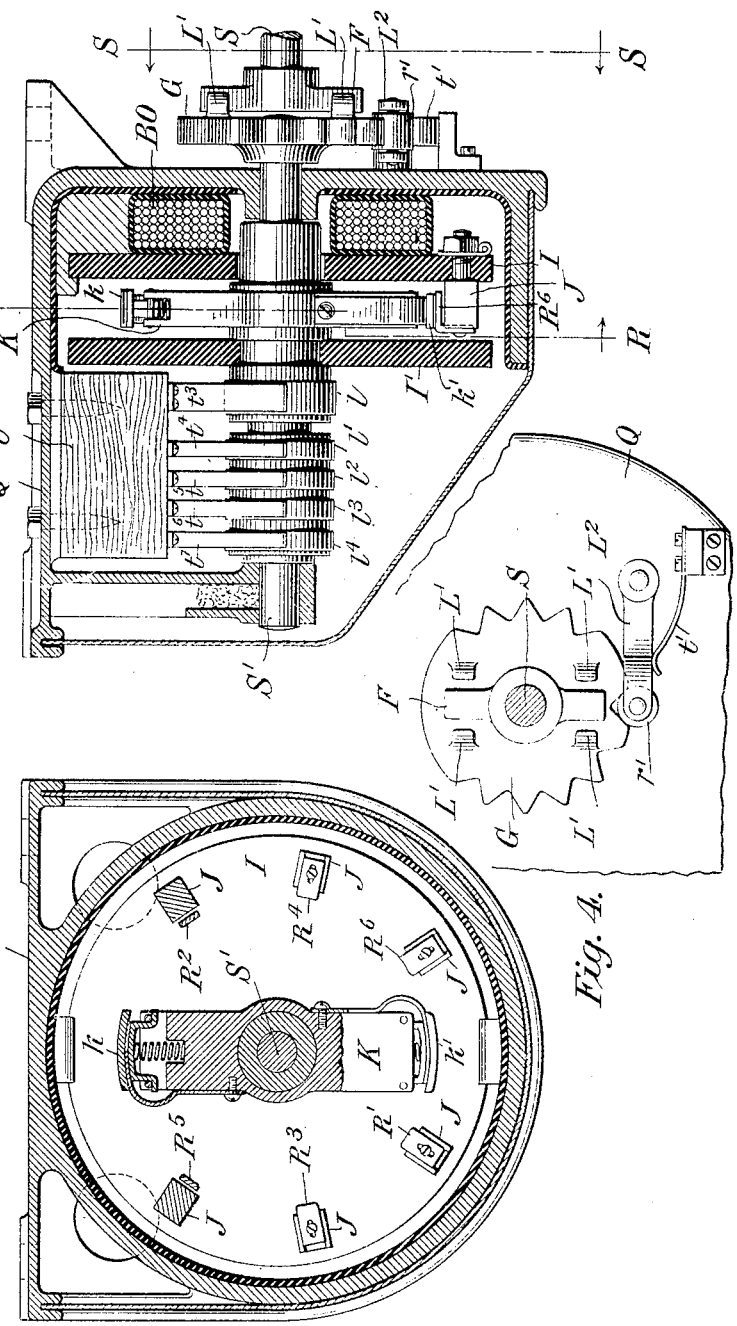
WITNESSES:
C. E. Ashley
M. F. Keating
INVENTOR
Charles A. Mudge
By his Attorney,
Charles J. Kintner No. 804,156. PATENTED NOV. 7, 1905.
C. A. MUDGE.
SYSTEM OF ELECTRIC MOTOR CONTROL.
APPLICATION FILED MAR. 2, 1905.
7 SHEETS—SHEET 3.
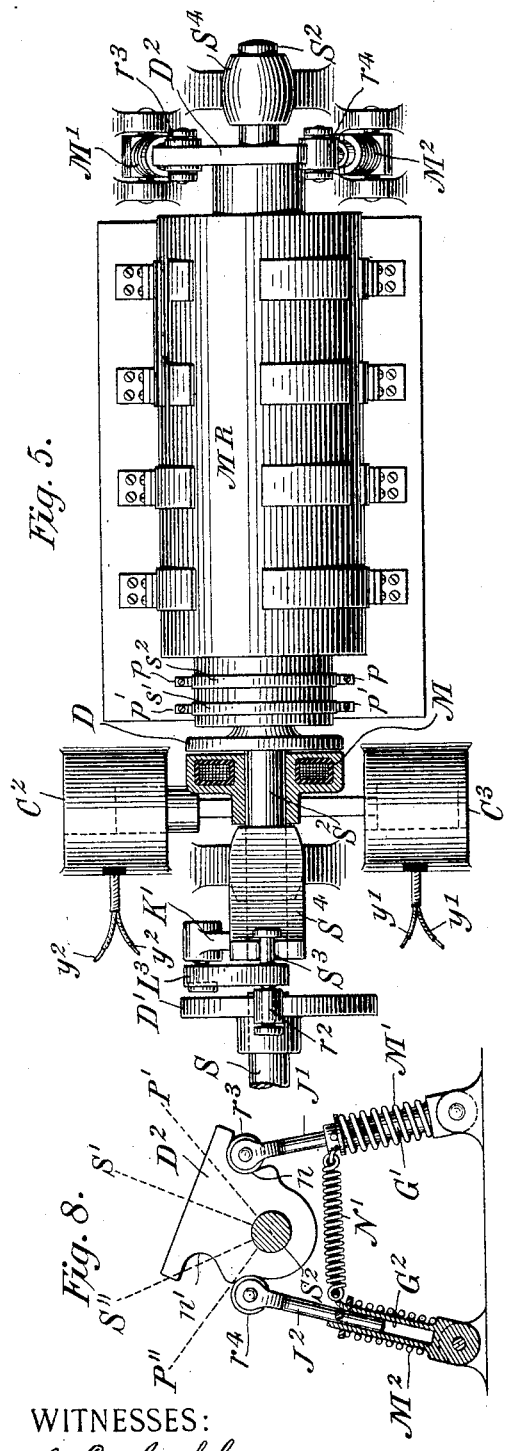
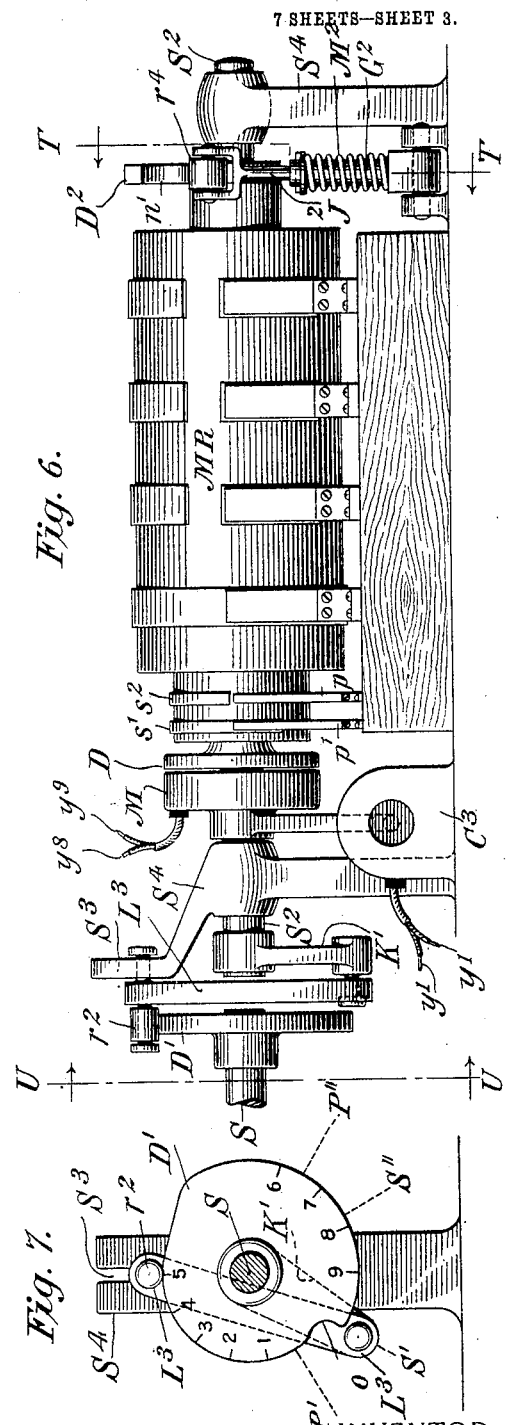
WITNESSES:
C. E. Ashley
M. F. Keating
INVENTOR
Charles A. Mudge
By his Attorney,
Charles J. Kintner

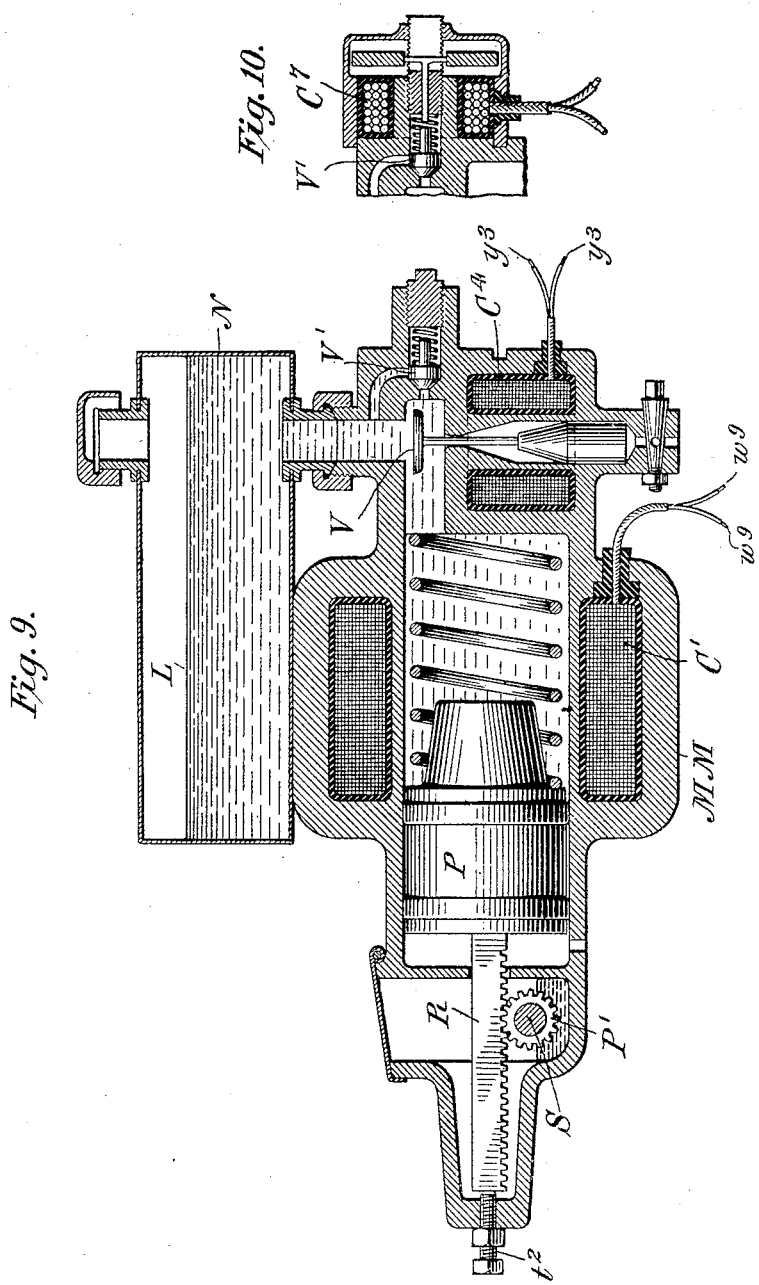

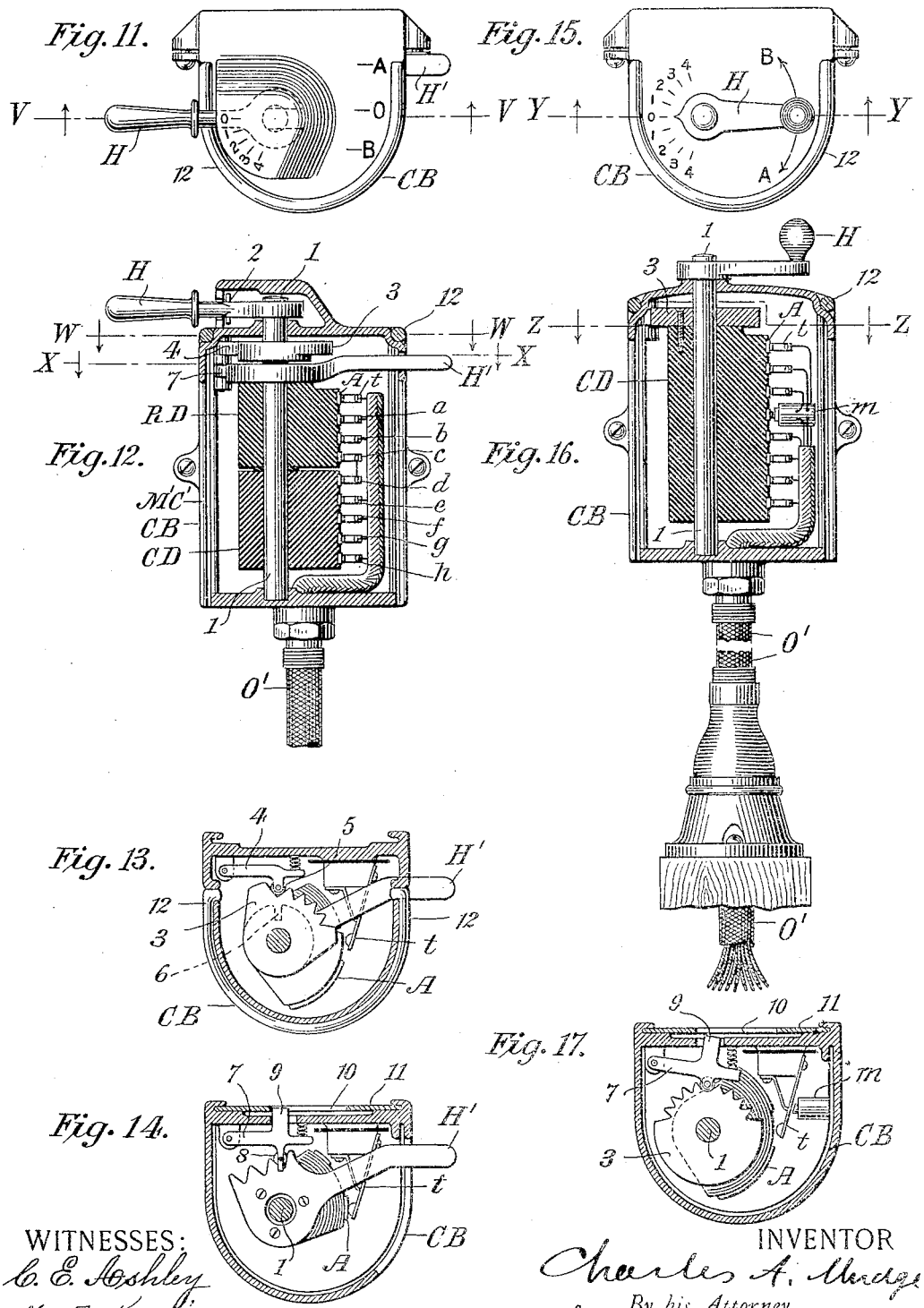

No. 804,156. PATENTED NOV. 7, 1905.
C. A. MUDGE.
SYSTEM OF ELECTRIC MOTOR CONTROL.
APPLICATION FILED MAR. 2, 1905.

7 SHEETS—SHEET 6.

UNITED STATES PATENT OFFICE.

CHARLES A. MUDGE, OF NEW YORK, N. Y.

SYSTEM OF ELECTRIC-MOTOR CONTROL.

No. 804,156. Specification of Letters Patent. Patented Nov. 7, 1905.

Application filed March 2, 1905. Serial No. 248,121.

*To all whom it may concern:*

Be it known that I, CHARLES A. MUDGE, a citizen of the United States, residing in New York, borough of Manhattan, county and State of New York, have made a new and useful Invention in Systems of Electric-Motor Control, of which the following is a specification.

My invention relates particularly to improvements in systems of control for the motors of electrically-propelled cars or vehicles, although it is applicable generally to the control of electric motors where it is desired to operate the same at one or more relatively distant points, and it has for its objects, first, to afford greater safety to life and property in isolating, so far as possible, the high-potential currents ordinarily used in systems of electrical energy from the point or points where the same is to be controlled; second, to provide means whereby valuable space may be utilized or saved where the controlling means, as ordinarily used with existing systems of electrical energy, and particularly in connection with railway appliances, permanently occupies or utilizes the same; third, to greatly decrease the cost of existing types of electric-motor control by diminishing, so far as possible, the quantity of expensive insulated cables and other appliances ordinarily used; fourth, to provide means whereby a single portable primary or master controller may be utilized by a motorman or engineer at different locations—as, for instance, upon either of the two platforms of a car or at different points in a factory or other place where electrical energy is utilized; fifth, to provide means whereby the acceleration of a car or train or the motors of a power system may be made wholly or absolutely independent of the will of a motorman or engineer; sixth, to provide means whereby all of the controlling parts of a system of electrical energy shall be centralized, in so far as possible, with relation to those parts of the controlling apparatus which effect the manipulation of the currents of great volume and high potential and when the primary controlling means is located at a relatively distant point and made effective in its operation upon the centralized main controlling means through the agency of currents of such volume and potential as will possess little liability of damage either to the installation or to persons in relatively close proximity thereto; seventh, to provide means whereby two or more cars may be coupled together and the motors thereof controlled each by a single main controller, all of said main controllers being operatively connected with a single primary or master controller; eighth, to provide means for automatically maintaining the current-flow to the motors practically constant; ninth, to provide a novel form of main operating device actuated by a source of energy, as electricity, compressed air, or the like and in such manner that its operation will control the movements of the movable or operative parts of the main circuit-controlling apparatus, so that the latter shall effectually manipulate all of the changes of potential and current volume or flow necessitated through the field and armature coils of existing types of electric motors, such as are utilized in electric-railway systems generally; tenth, to provide a portable primary or master controller for a system of electrical energy or an electric-railway car having means for effectually locking the same to a temporary support, such as the dashboard of a car or front wall of a motorman's cab, and in such manner that the same cannot be detached therefrom until the working circuit is wholly disrupted through the operative parts of the system to be controlled; eleventh, to provide a novel form of blow-out apparatus for effecting the disruption of the arc or arcs established in the main controller when the circuit or circuits is or are disrupted therethrough; twelfth, to provide a novel form of spring-sustained contacts for use in connection with a main resistance, whereby the best contact effects are obtained in the movement of the operative parts of the controller; thirteenth, to provide novel means for effecting the proper combinations of circuit relations for the motors; fourteenth, to so organize and arrange a system of electric-motor control that it will possess all the features of advantage attributable to the combined associated elements as a whole disclosed in the accompanying drawings, to which reference is had for enabling those skilled in the art to obtain a full, clear, and exact understanding of the construction and mode of operation, and in which—

Figure 19:
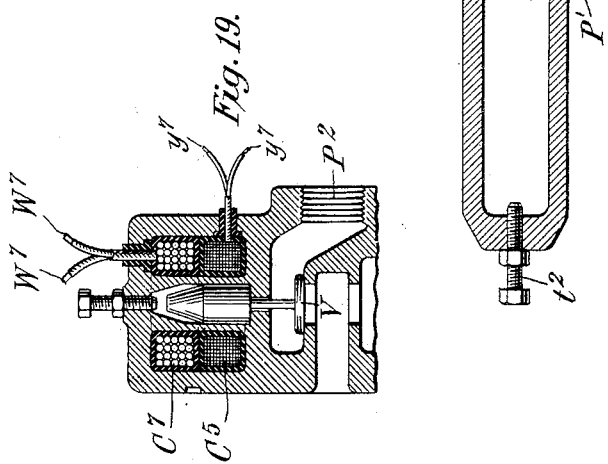
Figure 20:
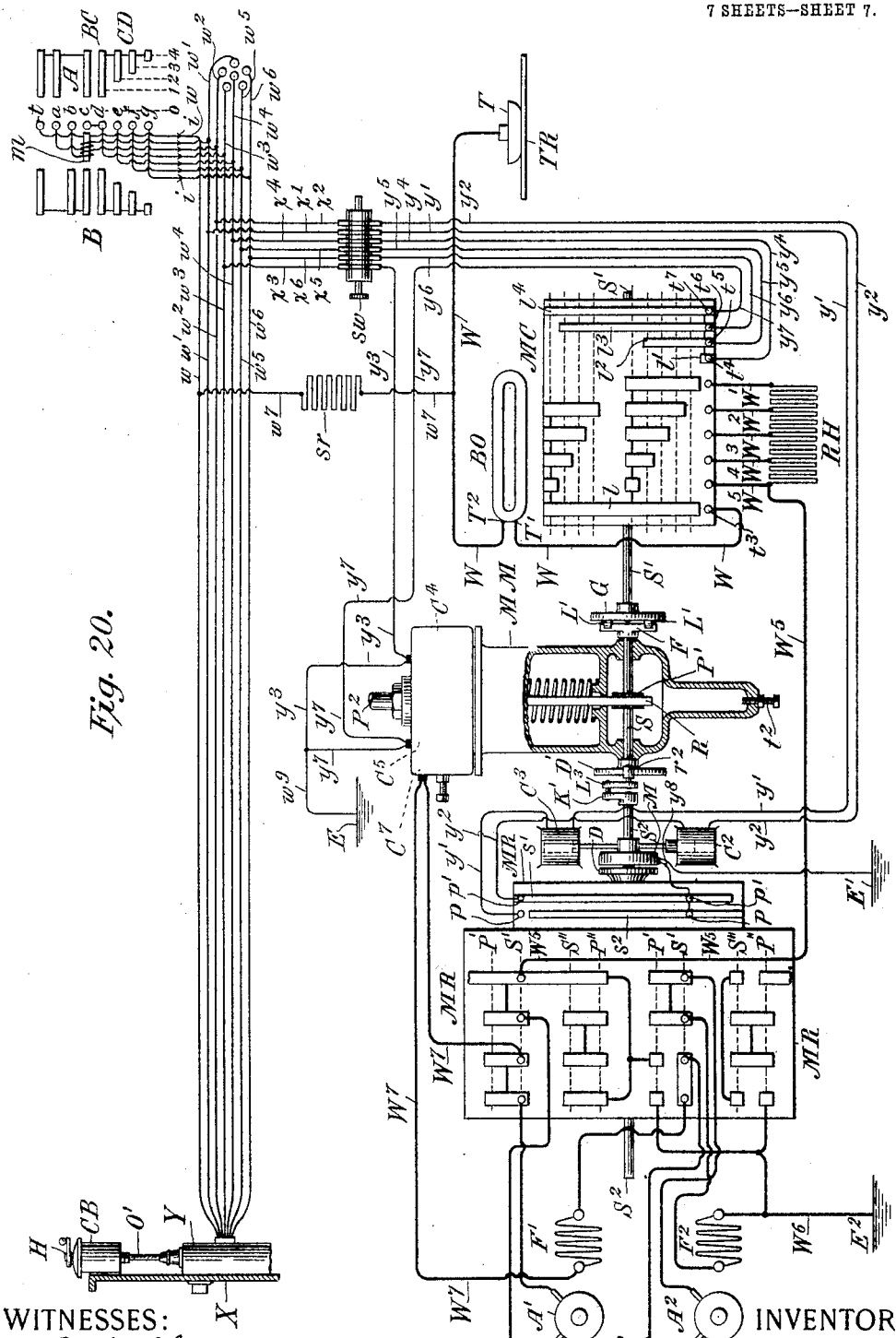

Figure 1 is a diagrammatic view of my improved system of control, illustrating the same as applied to an electrically-propelled car, the portable primary or master controller being shown on the left as attached to the dashboard thereof at one end of the car and on the right with the circuit-control contacts developed and operatively connected to the controlling-circuits, the main operating device being shown in sectional view and as operatively connected through rack-and-pinion gearing and shafting to the main controller and motor-circuit combiner, that part of the main controller which discloses the rotary or working contacts being shown as broken away or disconnected from the driving-shaft thereof and rotated through an angle of ninety degrees, the rotary contact strips and brushes of both the main controller and of the motor-circuit combiner being shown as developed and two series motors operatively connected to the latter, together with a trolley-shoe connected to a trolley-conductor or third rail, all of the return-circuits being illustrated as connected to earth at different points. Fig. 2 is an enlarged sectional view of the main controller, taken through Fig. 3 on the broken line R R and as seen looking thereat from left to right in the direction of the arrows; and Fig. 3 is a vertical sectional view of the main controller taken through Fig. 2, said figures illustrating conjointly the structural features of the main resistance-contacts for the main current, the blow-out coil therefor, and the relay and control contact strips and brushes for effecting the operation of the main operating device; and Fig. 4 is a sectional view taken through Fig. 3 on the line S S as seen looking thereat from right to left in the direction of the arrows, said figure illustrating in detail the connection between the main driving-shaft and the shaft which operates the main controller. Fig. 5 is a plan view of the motor-circuit combiner as seen looking at Fig. 6 from the top toward the bottom of the drawing, the coil of the magnetic clutch being shown in sectional view, said figure illustrating also the controlling solenoid-coils at one end for partially effecting the rotation thereof in either direction; and Fig. 6 is a side elevational view of the same as seen looking at Fig. 5 from the bottom toward the top of the drawings. Fig. 7 is a sectional view taken through Fig. 6 on the line U U and as seen looking thereat from the left toward the right in the direction of the arrows, and Fig. 8 is a similar sectional view taken through Fig. 6 on the line T T and as seen looking thereat from right to left in the direction of the arrows. Fig. 9 is an enlarged sectional view taken through the main operating device, showing its operative connection through rack-and-pinion gearing with a primary driving-shaft and also the means for effecting its complete operation. Fig. 10 is a detail sectional view of means for preventing abnormal current-flow through the motors at any time and also for keeping the current-flow practically constant therethrough during acceleration. Fig. 11 is an enlarged plan view of the primary or master controller of the drum or cylinder type as seen looking on the left of Fig. 1 from the top toward the bottom thereof. Fig. 12 is a vertical sectional view taken through Fig. 11 on the line V V and as seen looking thereat from the bottom toward the top of the drawing. Fig. 13 is a transverse sectional view taken through Fig. 12 on the line W W and as seen looking thereat from the top toward the bottom of the drawing, and Fig. 14 is a similar sectional view taken through Fig. 12 on the line X X and as seen looking in the same direction. Fig. 15 is a plan view of a modified form of the primary or master controller of the drum or cylinder type in which there is utilized a single controller-handle adapted to perform the several functions performed by the two operating-handles of the controller shown in the previous figures. Fig. 16 is a vertical sectional view taken through Fig. 15 on the line Y Y and as seen looking thereat from the bottom toward the top of the drawing in the direction of the arrows. Fig. 17 is a transverse sectional view taken through Fig. 16 on the line Z Z and as seen looking thereat from the top toward the bottom of the drawing. Fig. 18 is an enlarged sectional view taken through the main operating device of a modified form of the invention, illustrating its operative connection through rack-and-pinion gearing with the primary driving-shaft and means for effecting the operation of said device through the agency of compressed air or gas, the controlling-valves being illustrated as electrically controlled. Fig. 19 is a detail sectional view taken through one of the coils and that part of the main controlling device which prevents abnormal current-flow through the motors at any time and also for keeping the current-flow practically constant therethrough during acceleration. Fig. 20 is a diagrammatic view similar to Fig. 1 utilizing the primary or master controller illustrated in Figs. 15 to 17, inclusive, illustrating also the manner of applying the modified main operating device shown in Fig. 18 and of combining the same with a main controller, a motor-circuit combiner, and circuits and circuit connections, whereby the system may be effectually operated through the agency of compressed air, gas, or a liquid, illustrating also the application of the means for preventing abnormal current-flow through the motors at any time and also for keeping the current-flow practically constant therethrough during acceleration.

In systems of electric-motor control such as are now ordinarily found on cars used in the service of street and interurban railways two controllers of relatively large proportions are found necessary, and the same are permanently secured directly to the dashboards at each end of the car. The main or operative current is led through different sections of the controlling resistance, giving the required potential and volume of current at the motors for the requisite speed and torque. These controllers necessarily occupy much valuable space on the platform of the car or in the motorman's cab, and as the resistance connections must necessarily be made to both of them a very large amount of heavy expensive cables is required. In case of defective insulation burn-outs or what is termed "fireworks" sometimes occur at these controllers, which by reason of their proximity to passengers necessarily frighten them, so that not infrequently damaging accidents occur. In systems utilizing motor-operating currents of potential higher than from five hundred to six hundred volts it is advisable to locate the operative or controlling parts away from the platforms of the cars, and particularly is this true in cases where the potential is abnormally raised, such a condition necessitating much higher insulation. It is also a fact that the acceleration or speed of a car depends with existing systems entirely upon the will of the motorman, owing to the fact that he may through the manipulation of his controller-handle "jam on," so to speak, too much current, thereby starting the car or train too suddenly, much to the discomfort of the passengers and also the detriment of the motors and other parts of the apparatus, the strain put upon the parts of the system, both mechanically and electrically, ultimately seriously damaging the same, so that frequently cars have to be sent to the shops for repairs. These constitute a few of the objections raised to existing systems of motor control so generally used.

For the purpose of reducing so far as possible the objectionable features I have devised a system in which the main or operating current is kept absolutely away from the platforms of a car and is controlled by an independent control system in which the control-current is received either from the main circuit through sufficient resistance to minimize the damaging effects or from a local source of electrical energy of relatively low voltage. In place of the ordinary controller above referred to I utilize what I call a "portable primary" or "master" controller, which is so constructed and arranged that it can be temporarily attached and locked directly to the dashboard or front platform on which the motorman stands or to the wall of his cab, and so arranged that the motorman may transfer the same from one end of the car or from one end of the train to the other end thereof, as desired, thereby saving important space upon the platforms or in the cabs and enabling him to operate the car or an entire train with this single primary or master controller. The motor-operating currents are led from the trolley or contact-shoe, which rests upon or against the trolley-conductor or third rail in the usual way, to a main controller, after which they are conveyed by a system of conductors through the manipulation of a single main operating device to and through a motor-circuit combiner and the field and armature circuits of the motors, thereby saving a great amount of heavy and expensive insulated cables, and particularly by reason of the fact that only one main operating device is required for each car where the invention is used in connection with railway-cars.

The main controller and the motor-circuit combiner on each car are operated by a single main operating device operatively connected through a rack-and-pinion gearing with a primary driving-shaft and the circuit-directing parts for the main current. In Figs. 1 and 9 of the drawings I have shown this main operating device in the nature of a solenoid having a core electrically operated in one direction and retarded in its movement by a liquid medium and moved in a reverse direction by a spring and in the other, as illustrated in Figs. 18 and 20, an air-cylinder in which the piston is operated by compressed air and electrically controlled. This main operating device, as illustrated in Figs. 1 and 9, is directly controlled from the platform by the primary or master controller inclosed in a controller-box detachably secured to the dashboard or other temporary support at either end of the car, circuit connections being effected from said controller to and through the solenoid-coils of a controlling-relay and operating solenoid-coils with the necessary device for regulating the speed of the motors. The primary or master controller utilizes currents of relatively low amperage, thus avoiding damaging arcing and what is known as "fireworks," which always frighten passengers at those points where the motorman manipulates the primary control portion of the apparatus. The utilization also, when preferred, of local primary-controlling systems of relatively low voltage, preferably one or more batteries on each car, accomplishes the same desirable results, and on lines operating with potentials higher than the usual voltage the insulation of the cables carrying the main or motor operating currents can be easily made much safer than is the case with existing systems where the operating-currents are carried through the car from one platform to the other so often.

The principal difference between my novel system and others having primary controlling-circuits by which the apparatus controlling the motors is operated lies in the use of a single operating device, termed in this specification a "main operating device," instead of a number of such devices, as heretofore utilized, and which have heretofore been made operative by various types of contactor devices for making the proper combinations for conveying the main current to the motors in the desired relation. By using a main operating device I secure valuable features heretofore not obtained by other systems without numerous complications, and I very much simplify the control and operation of the motors. I also make use of a novel form of main controller not heretofore known or used, so far as I am aware, and which by reason of its simplicity of construction makes it possible to very materially reduce the cost of such apparatus and also overcome the serious damaging results from any arcing at the contacts, and by the use of the main operating device in the manner hereinafter described and claimed I am enabled to very much simplify the structural parts and circuits and circuit connections heretofore used for effecting like results, my combined apparatus not only effecting results which have heretofore been effected, but improved results and new results, as will be fully appreciated on referring to the accompanying drawings, in which like letters and numerals of reference represent like or equivalent parts wherever used.

I will first describe the essential operative parts and then the details of construction as operatively connected thereto, after which a description of the mode of operation will be given, describing first the preferred form of the invention illustrated in Fig. 1. It is to be noted at the outset that all of the controlling-conductors which connect the several parts of the system for the purpose of effecting the operation of the various apparatus are represented by light lines and by the letters $w$ to $w^9$, inclusive, $x'$ to $x^6$, inclusive, and $y'$ to $y^9$, inclusive, while all of the conductors which convey the main or working currents to and through the main controller, the motor-circuit combiner, and the means for maintaining the current-flow to the motors practically constant are represented by heavy lines and letters W to $W^7$, inclusive.

M'C' represent the primary or master controller, inclosed in a metallic box CB, as shown in Figs. 11, 12, 13, and 14, the same being illustrated in Fig. 1 as attached directly to the dashboard X on one of the platforms of a car and adapted to be disconnected therefrom, as will be described later on, Y constituting a permanent casing secured in a proper position for inclosing the several connections for properly effecting connection between the primary or master controller and the controlling-conductors connected thereto, as shown at $i$ $i$ on the right of Fig. 1, which connections are preferably in the nature of contact-plugs, there being one set of such plugs at each end of the car. O' is a short section of flexible cable inclosing all of the conductors between the primary or master controller and the contact-plugs $i$ $i$. CD is the controller-drum, and RD the reverser-drum, of the primary or master controller, the same being carried by a vertically-disposed shaft, (see Fig. 12,) said drums being respectively provided with movable contacts BC, A, and B.

$t$ $a$ $b$ $e$ $f$ $g$ $h$ are stationary contacts in the master-controller operatively connected to the contact-plugs $i$ $i$, and $c$ $d$ are similar stationary contacts interconnected, all of these parts being shown in developed plan view at the right of Fig. 1.

H H' are respectively the operating-handles of the master-controller drum and the reverser-drum. The upper end of the shaft 1 is squared on two sides, so as to receive the wrench-like end of the handle H when the drum CD is in "off" position, 2 being a pin extending through the handle and adapted to be inserted through a slot in one side of the cap of the box CB, the arrangement being such that when the handle is in all other positions the pin prevents the removal thereof.

3 is a locking-disk rigidly secured to the shaft 1 and provided with five locking-notches corresponding to the five positions of the operating-handle H, and 4 is a dog pivotally secured to the inner wall of the box and provided with a roll 5 and a spring at its outer end, the function of said dog, roll, and spring being to temporarily hold the operating-handle H in any one of the five positions. The lower surface of the disk 3 is provided with a downwardly-extending cylindrical part in which is cut a locking-notch 6, and the enlarged inner end of the operating-handle H', journaled on the shaft 1, is provided with three notches adapted to receive a roll 8, journaled in a locking-pin secured to a dog 7, pivoted to the inner surface of the box, 9 being an additional locking-pin adapted to extend outward through a slot 10 in a locking-plate 11, firmly attached to the dashboard, the arrangement being such that when all of the parts are in position upon the dashboard this primary or master controller cannot be removed unless the handles H and H' are both in their off positions, with the locking-pin 9 withdrawn from the slot 10 as the roll 8 falls into its central notch. 12 is a bail or handle pivotally secured to the top of the box and so arranged that when the same is in its locked position on the dashboard said bail lies in a groove around the top and under the operating-handle H, as shown.

Referring again to Fig. 1, $sw$ is a multiple switch for disconnecting all of the conductors $x'$ to $x^6$, inclusive, from the circuit. $sr$ is a secondary resistance for limiting the current-flow from the main or working circuit W to the first one of the master controller-conductors $w$. MM is the main operating device, illustrated in Figs. 1 and 9 as being electrically operated and controlled and in Figs. 20 and 18 in the modified form of the invention as operated by pneumatic pressure and controlled electrically. MC is the main controller, and RH is a main resistance divided into sections, as shown, and connected by conductors W' to $W^5$ to stationary contacts R' to $R^6$, inclusive, and MR the motor-circuit combiner.

The movable contacts for cutting the resistance into and out of circuit and the movable contact-strips carried by the drum of the main controller are supported by a shaft S' and the motor-circuit combiner by a shaft $S^2$, connected to shaft S, which is journaled in the supporting-frame of the main operating device MM. $r$ is a controlling-relay, $s$ the core thereof, the coil of said relay being included in one of the controlling-circuits $y^7$. $bo$ is a blow-out coil of well-known form adapted when the circuit is disrupted to extinguish the arc between the relay-contacts $c'$ $c^2$. $C^2$ $C^3$ are the coils of operating-solenoids included in the controlling-circuits $y^2$ $y'$. A' $A^2$ F' $F^2$ represent the armatures and field-coils of two electric motors of the series type, connected in a manner which will be obvious on inspection of the drawings to the contacts on the drum of the motor-circuit combiner carried by the shaft $S^2$.

Referring now to Figs. 2 and 3, I will describe in detail the parts of the main controller MC. Q represents the supporting-frame, in which is journaled the shaft S'. K is a contact-arm carrying at its outer ends two spring-sustained contacts $k$ $k'$, constructed, as shown in Fig. 2, so that they will make good yielding contact with additional adjustable contacts R' to $R^6$, supported upon an insulating-base I by standards J. BO is a blow-out coil located around the shaft S' and included directly in the main or working circuit, said coil being adapted to disrupt the arc between the rotary spring-sustained contacts $k$ $k'$ and the stationary contacts R' to $R^6$ in a manner which will be obvious to those skilled in the art. $l$ $l'$ $l^2$ $l^3$ $l^4$ are contact-strips located on the drum of the main controller MC. $t^3$ $t^4$ $t^5$ $t^6$ $t^7$ are stationary contact-brushes attached to an insulating-block U, secured directly to the frame Q. I' is an insulating-partition separating the circuit-interrupting contacts of the main circuit from the control-contacts connected with the drum of the main controller MC.

Referring now to Figs. 5, 6, 7, and 8, I will describe in detail the motor-circuit combiner, which is carried by the shaft $S^2$, journaled in standards $S^4$ $S^4$, said combiner being provided with the usual stationary brushes and movable contact-strips, together with the additional stationary brushes $p$ $p'$ $p$ $p'$ and movable contact-strips $s^2$ $s'$, all of the conducting parts of said combiner being shown in developed plan view in Fig. 1. $S^3$ is a guiding-slot in one of the standards $S^4$ for a pin in one end of the link $L^3$. D is a magnetic clutch-disk rigidly secured to the shaft $S^2$, and M is a magnetic clutch adapted to move longitudinally upon the shaft $S^2$ and temporarily clutch the disk D when the circuit is closed through the conductors $y^8$ $y^9$. The two shafts S' $S^2$ are in alinement with the main driving-shaft S, and the shaft S' is connected thereto by a loose coupling adapted to effect a definite amount of lost motion, the same consisting of an arm F, carried by the shaft S, and a toothed coupling-disk G, carried by the shaft S', said disk being provided with four lugs L', located in the path of the two ends of the arm F. $L^2$ is a pivoted lever provided at its free end with a roll $r'$, said roll being held firmly against the outer face of the disk by a strong leaf-spring $t'$, the function of which is to cause the drum of the main controller MC as it is moved forward by successive steps to suddenly interrupt the circuit between the contact-brushes $t^3$ to $t^7$ and the contact-strips $l$ to $l^4$ at the several positions of rotation of said drum and also to hold the parts carried by the shaft S' in a definite position. The main shaft S is provided at its free end with a cam D', adapted to actuate as said shaft is rotated a roll $r^2$, connected, through a link $L^3$ and a crank K', with a shaft $S^2$, the primary operation of said shaft being effected through the action of the solenoid-coils $C^2$ $C^3$, as will be more particularly described in connection with the description of the mode of operation. $D^2$ is a holding device rigidly secured to the other end of the shaft $S^2$ and provided with notches $n$ $n'$, adapted to receive rolls $r^3$ $r^4$, secured to the free ends of pivoted sliding rods J' $J^2$, yieldingly sustained in hollow sleeves G' $G^2$, surrounded by springs M' $M^2$, N' being a strong spiral spring tending to draw said rods and their supported rolls $r^3$ $r^4$ against each other and hold them in firm contact with the curvilinear face of the holding-disk $D^2$.

Referring now to Fig. 9, I will describe the main operating device MM, the frame of which is of magnetic material and embraces a solenoid-coil C', located in the operating-circuit of the conductor $w^9$ $w^9$. P is a piston, of magnetic material, adapted to move back and forth in a cylinder filled with a liquid L, such as oil or water, directly supplied by the action of gravity from a reservoir N, a strong spiral spring being shown for returning the piston P to its normal position. R is a rack connected to the piston P and geared with the pinion P' on the main shaft S. $t^2$ is a set-screw for regulating the adjustment of the complete stroke of the piston. V is a main valve for regulating the inflow of the liquid into the cylinder, said valve being connected to a solenoid-core controlled by a solenoid-coil $C^4$ in circuit with the conductor $y^3$. V' is an exhaust-valve provided with means for yieldingly adjusting it against its seat, its function being to regulate the outflow of the liquid L from the cylinder into the reservoir N when the main valve V is closed.

In Fig. 10 of the drawings I have illustrated means for effecting a double function—namely, tending to keep the current in the motor-circuits constant and also permitting the transition from series into parallel combinations to be made rapidly—and this is brought about by means of a solenoid-coil $C^7$ of relatively low resistance, which is connected directly in series circuit with one of the motors, as shown in Fig. 1, an armature being provided, as shown, connected directly to a stem having sliding movement in an adjustable nut, the free end of the stem being in close proximity to the free or outer end of the stem of the valve $V'$.

The features described in the two preceding paragraphs include the hydraulic and electric means embraced in the main operating device and additional means, shown as a strong spiral spring, for returning the operative parts to off position.

In the wiring of each car the conductors $w$ to $w^6$, inclusive, are preferably inclosed in a flexible conduit or cable, like $O'$, and at each end of the car these conductors are provided with contacts, as shown at the right of Fig. 1, for the purpose of effecting the electrical connection of one or more cars together, so as to make the system of control applicable to train service, a flexible interconnecting cable between each pair of cars being provided with contacts for connecting the adjoining sets of contacts above referred to, it being understood that when a number of cars are thus connected together the system of control is of the type known as the "multiple-unit" system.

TR represents the trolley-conductor or third rail, and T the current-collector or trolley-shoe.

Referring now to the diagrammatic view illustrated in Fig. 1, I will describe the mode of operation upon the supposition that the portable primary or master controller $M'C'$ and its inclosing box CB have been transferred from the position shown at the left of the drawing to the right-hand position, where the operating-contacts are shown as developed. The several positions of the handle $H'$ represent the positions "ahead," "off," and "back," as indicated by the letters A, O, and B, Fig. 11. With the primary or master controller $M'C'$ in the position shown at the right of Fig. 1 there is electrical potential from the trolley T through the conductor W to the point $t^3$ on the main controller MC, an additional potential occurring through the branch conductor $w^7$, through part of the secondary resistance $sr$, conductor $w^8$, blow-out coil $bo$ at the stationary contact $c'$ of the relay $r$, and still a third potential by way of the resistance $sr$, branch conductors $w^7$ $w$, to the contact $t$. For forward running the reverser-drum RD is turned through the agency of the handle $H'$ until the contacts $t$, $a$, and $c$ make contact with the ahead-contacts A. This throws potential on contacts $a$, $c$, and $d$. Following out the circuit from $a$, we pass by conductors $w'$ $x'$ $y$, solenoid-coil $C^3$, to the stationary brush $p$ on the drum of the motor-circuit combiner MR, where the circuit is interrupted, which means that the motors are properly connected for a forward motion of the car, as observed from the right-hand platform. If a reverse motion of the car be desired, the contacts B are moved under contacts $t$, $b$, and $c$, and the circuit is from $b$ through conductors $w^2$ $x^2$ $y^2$, solenoid-coil $C^2$, contact-strip $s'$, conductor $y^8$, coils of the magnetic clutch M, to earth at $E'$, so that current flowing therethrough energizes the solenoid-core of the coil $c^2$ and also the magnetic clutch M, which, as before stated, is loose on the shaft $S^2$ and pivotally attached to the arm which joins the cores of the two solenoid-coils $C^2$ $C^3$. On being energized this magnetic clutch is held against the clutch-disk D, which is attached to the shaft $S^2$, carrying the motor-circuit combiner MR. Current flowing through the solenoid $C^2$ attracts its core and the drum of the motor-circuit combiner MR is rotated until the current is interrupted by the contact-strip $s'$, passing from under the lower right-hand brush $p'$ as it slides off the contact-strip $s'$, which takes place when the circuit-connecting contacts carried by the motor-circuit combiner MR are in the position $S''$, giving proper connection for a reverse motion of the car, as observed from the front platform. When this circuit is interrupted, as just described, the solenoid-coil $C^2$ and magnetic clutch M are demagnetized and the clutch-disk D is no longer held fast. Potential is now on contact $d$ of the primary or master controller $M'C'$, and the motor connections we will assume are proper for forward running. The handle H of the master-controller is now turned to position No. 1, which closes circuit from $e$, through conductors $w^3$ $x^3$ $y^3$, through the solenoid-coil $C^4$, thereby energizing the core thereof and lifting the main valve V to its closed position and preventing any liquid in the reservoir N flowing into the cylinder. The handle of the primary or master controller is now rotated to position No. 2 and the circuit is closed as follows: from contact $f$, through conductors $w^4$ $x^4$ $y^4$, contact-brush $t^4$, contact-strip $l'$ to contact-strip $l^4$ on the main controller, contact-brush $t^7$, conductor $y^7$, solenoid-coil of the controlling-relay $r$, conductor $y^7$, conductor $w^9$, to earth at E, thereby causing the solenoid-core $s$ to close the relay-contacts $c'$ $c^2$. A branch of the circuit therefore flows from the trolley or current-collector T, conductor W, conductor $w^7$, a portion of the secondary resistance $sr$, conductor $w^8$, blow-out $bo$, contacts $c'$ $c^2$, conductor $w^9$, through the main solenoid-coil $C'$ of the main operating device MM, to earth E. This coil $C'$ being energized, the piston P, constituting a solenoid-core, is drawn forward against the action of the restoring-spring, and motion is imparted, through the rack R and pinion $P'$, to the shaft S in the proper direction to rotate the shaft $S'$, so that as it advances the contacts $k$ $k'$ and contact-strips $l$ $l'$ $l^2$ $l^3$ $l^4$, carried by the drum of the main controller, revolve therewith. The contact-brush $t^3$ of the main controller MC makes contact with the contact-strip $l$, thereby throwing potential on the two spring-sustained contacts $k$ $k'$, carried by the rotary arm K, so that as this arm advances the contact $k'$ makes electrical contact with stationary contact R', closing the motor-circuit directly through the heavy conductors W' W', the entire resistance, conductor $W^5$, the contacting connections of the motor-circuit combiner MR, through the armature A', coil $C^7$, and field-coils F' of the first motor and armature $A^2$ and field-coils $F^2$ of the second motor to conductor $W^6$, to earth $E^2$. As the middle of the contact $k'$ reaches the stationary contact R' the stationary brush $t^4$ slides off the end of the contact-strip $l'$, and the circuit to the coils C' of the main operating device is interrupted at the contact-point $c'$ $c^2$ by reason of the fact that the controlling-relay $r$ was demagnetized when the circuit was interrupted at the first-named point. Consequently the piston P is held at this position by the action of the liquid held in the cylinder, because the valves V V' are closed. With the operative parts of the system in the position just described the car starts forward at first or slow-running speed with both of the motors in series relation and all of the resistance in circuit. The primary or master controller is now turned to position No. 3, and this completes the circuit from contact $g$, through conductors $w^5$ $x^5$ $y^5$, contract-strip $l^2$, conductor $y^7$, to and through the controlling-relay, thus closing the circuit of the coil C' at the contacts $c'c^2$ as before, so that the shaft S is again caused to rotate, and as it rotates the spring-contact $k$ is brought into electrical contact with the stationary contact $R^2$, connected by conductor $W^2$ with the resistance, current flowing to the motors through the parallel paths W' $W^2$, the resistance, and the conductors $W^5$ $W^6$, to earth. As the shaft continues to revolve the contact $k'$ is interrupted with the stationary contact R', while the circuit is maintained closed between the contact $k$ and the stationary contact $R^2$, so that the total current flows through conductor $W^2$, after which contact is made between contact $k'$ and $R^3$. Then circuit is interrupted between contact $k$ and $R^2$, and so on until contact is finally made between $k'$ and $R^5$, there being such a prearranged succession of contacts and interruptions that the entire working circuit is never wholly interrupted at one time between the movable or rotary contacts $k$ $k'$ and the fixed or stationary contacts R' to $R^6$, inclusive. Finally, the contact-strip $l^2$ passes from under the contact-brush $t^5$ and the circuit is interrupted through the coil C', as before, and the parts remain stationary with the motors running in full series position and without any resistance in circuit, the current flowing from the conductor W by terminal $T^2$, through blow-out coil BO, terminal T', contact-brush $t^3$, contact-strip $l$, conductor $w^{10}$, contact $k'$, stationary contact $R^5$, conductor $W^5$, as before. The next movement of the master-controller is to position No. 4, which closes circuit from contact $h$ through conductors $w^6$ $x^6$ $y^6$, stationary contact-brush $t^6$, contact-strip $l^4$ to relay $r$, as before, so that current is again caused to flow and the shaft S is again placed in rotation. Before the circuit is interrupted between the contacts $k'$ and $R^5$, however, circuit is made between contacts $k$ and $R^6$, which cuts the entire resistance into the motor-circuit again, thereby reducing the current-flow to a low figure, and the arm K starts forward again. The shaft S', its supporting-frame, and arm K are of magnetic material. Hence the arm acts both as a conductor for the working currents and as a conveyer of magnetic lines of force established by the blow-out coil BO through the frame, shaft, and arm, and this constitutes an important feature in my invention, in that all possibility of arcing being sustained at these contacts at the end of this arm is entirely prevented. The contacts $k$ $k'$ being yieldingly sustained at the ends of the arm K and seated each in rigid supports at one end, as shown, gives the best possible contact result and with little danger of arcing. The next operation is to place the motors in parallel, and this is effected by the operation of the cam D' on the shaft S, and the roll $r^2$ resting thereon acts, through the link $L^3$ and crank K', to rotate the shaft $S^2$ by reason of the inclined surface of the cam (illustrated in straight lines) from the position 5 to the right, as seen in Fig. 7. This action rotates the shaft $S^2$, so that the movable contacts pass from the position S' to P' or from S'' to P'', the position S' or S'' corresponding to a forward or reverse movement of the car as given previously to the motor-circuit combiner MR by the action of the solenoids $C^2$ or $C^3$ and magnetic clutch M. In the 0 or off position corresponding to the 0 or off position of the primary or master controller illustrated by the position of the controlling-handle H in Fig. 11 and in the developed position at the right of Fig. 1 the roll $r^2$ lies in the notch $o$ of the cam D', said notch at that time, however, being parallel with the slot $S^3$. As the shaft S revolves the cam D' revolves with it, being keyed thereto, and the roll $r^2$ passes successively over the positions indicated from 0 to 5, corresponding to the like positions of the arm K and the contacts $k$ $k'$, carried thereby. Between the positions 5 and 6 this roll $r^2$ is moved, as already described, upward from the center of the shaft in the slot $S^3$, thereby turning, as before stated, the motor-circuit combiner from position S' or S'' to P' or P'', giving parallel combination of the motors, as shown in Fig. 1 at P' or P'', dependent upon the direction of movement of the car. As the motor-circuit combiner MR is turned from series to parallel position the holding device $D^2$, Fig. 8, carried at the other end of the shaft $S^2$, is turned from the position S' to P', compressing the spring M', which tends to return the motor-circuit combiner MR to its original position S', but it is kept from doing so by the cam D', the roll $r^2$, and the link $L^3$, being thus held in the position last indicated. The sliding rods J' $J^2$ being duplicated and held together by the action of the strong spring N', when compressed they tend to turn the holding-disk $D^2$ in a reverse direction or into the position S' or S'' whenever it is in the position P' or P'', the function of said parts also being to hold the motor-circuit combiner firmly in these positions. When the shaft S is rotated in reverse direction and as the cam D' passes under the roll $r^2$ from position 6 to 5, the spring M' returns the motor-circuit combiner to the series position S', so that the motors are always in series when the disk is in one of the first five positions or in the zero or off position. Upon the assumption, therefore, that the circuits are closed for the fourth position of the primary or master controller the shaft S revolves and the arm K of the main controller revolves with it, the contacts k k' passing over the contacts R' $R^2$ $R^3$, &c., as the shaft S' continues to rotate, as was described before in connection with the series operation of the main controller, and this continues until the contact-strip $l^3$ moves from under the contact-brush $t^6$, thereby opening the relay-circuit at the relay-contacts c' $c^2$, and the motor-controller is held in the ninth position, with the motors running in parallel with all resistance cut out of circuit. To cut the motors out of circuit, the handle H of the primary or master controller is returned to zero position, which breaks the circuit $y^3$ of the solenoid $C^4$, controlling the main valve V, thus opening the passage-way to the reservoir N and allowing the liquid therein to be drawn into the cylinder as the piston P is returned to its normal or off position by the action of the strong spring. As the circuit is interrupted between the rotary contacts k k' and the stationary contacts R' to $R^6$ in either its forward or reverse motion any flashing or arcing which may occur at those points is immediately blown out by the magnetic lines of force set up from the blow-out coil BO, and for like reason any tendency to flash or arc between the contact c' $c^2$ of the relay r is dissipated by the blow-out coil BO. If it be desired to run at a speed corresponding to any position between 1 and 9, the primary or master controller is returned to position 1 when this speed has been reached. This arrests the further movement of the main operating device MM, and the main controller is held in the proper position for the desired speed. The main controller is returned to the off position, cutting off current from the motors either by the primary or master controller being turned to 0 position or by any interruption of the current—as, for instance, by reason of the trolley coming off. The rapidity with which the motor resistance is cut out is independent of the motorman by reason of the fact that the spring-seated exhaust-valve V' is made adjustable and constitutes a regulating device whereby the flow of the liquid into the reservoir N is regulated in such manner that even though the main operating-handle of the master-controller be turned to full speed the piston P will follow the action thereof at a regulated speed, dependent upon the adjustment of the valve V'.

For equipments where it is desired to limit the current in the motor-circuit during acceleration the valve V' may be provided with a controlling electromagnet or solenoid $C^7$, as illustrated in Fig. 10 and previously described, the mode of operation of which is as follows: The coil $C^7$ being connected directly in circuit with one of the motors, as illustrated in Fig. 1, when the current-flow through this coil becomes too large the armature is attracted with sufficient force to cause the free end of the sliding stem to bear firmly against the free end of the valve-stem, thereby seating the valve V' directly in its seat. When the current is interrupted through the coil $C^7$, as it is when the motor-circuit combiner is operated to transfer the motor-circuits from series to parallel, the pressure on the valve-stem is instantly removed and the valve V' is quickly unseated, thus allowing the liquid in the cylinder to flow rapidly back into the reservoir N, thereby permitting increased speed of action during the time that the motors are being changed from series to parallel combination. It is to be noted, further, that after the parallel combination of the motor-circuits is effected the circuit is again closed through the solenoid-coil $C^7$ and the resultant action upon the valve V' is as before.

In Figs. 15 to 20, inclusive, I have disclosed a modified form of the invention in which I have substituted compressed air as the operating medium and have provided a primary or master controller in which there is only one operating-handle H, attached to a single shaft l and carrying a single controller-drum to which all of the movable contacts are attached, both for reversing and for effecting the various combinations of circuits to the motors.

Referring first to Figs. 15 to 17, inclusive, I will describe the modified form of primary or master controller which, it will be observed on examination of Fig. 17, is provided with substantially the same means as was before described in connection with Figs. 11 to 14, inclusive, for locking it to a stationary support, except that the disk 3 is provided with nine notches for holding the controller in the various positions, and the other disk, which constituted a part of the reverser-handle in Fig. 14, is done away with. In this form of the primary or master controller $m$ represents an electromagnet which is provided with two energizing-coils, one in circuit with the stationary contact $a$ and the controlling-conductors $w'$ $x'$ $y'$ and the other with the stationary contact $b$ and the controlling-conductors $w^2$ $x^2$ $y^2$, running, respectively, to the reversing-solenoids $C^3$ and $C^2$, the armature of the electromagnet being placed directly above the yielding supported contact $c$ in such manner as to hold said contact away from the A or B contacts according as the handle H is rotated either to the right or left when the magnet $m$ is energized, as will be more particularly described in connection with the description of the mode of operation. The other features of the primary or master controller are not substantially different from those of the first-described primary or master controller, except that, of course, the several positions for ahead and back are indicated directly on the top plate of the controller by the numerals 1, 2, 3, and 4 in either direction from the numeral 0, indicating the off position and the other numerals on ahead or back positions according as the handle is turned, as indicated by the curved arrows, Fig. 15.

Referring now to Fig. 18, I will describe in detail the construction of the modified form of the main operating device MM. The piston P in this instance is located in an air-cylinder and is provided with a rack R and return-spring, said rack being geared to the pinion P' and main shaft S, as previously described in connection with the preferred form of the invention. P² is an inlet-pipe running to a supply of compressed air or gas, (not shown,) and V' V are respectively the main and exhaust valves, as before. $C^5$ and $C^4$ are solenoids for controlling the movement of the valves V' and V, the arrangement being such that when air is admitted it moves the piston from right to left and when exhausted it moves from left to right under the action of the spring. In Fig. 19 is shown the means applicable to this form of the invention for preventing abnormal current-flow through the motors at any time and also for keeping the current-flow practically constant therethrough during acceleration. In this part of the apparatus the coils $C^7$ and $C^5$ are so related that they produce magnetic fields in opposite direction, or, in other words, a differential effect upon the solenoid-core which supports the valve V'.

Referring now to Fig. 20, it is to be noted that in this form of the invention the controlling-relay $r$ (illustrated in Fig. 1) has been done away with and also that the main controller MC is substantially of the type of main controllers well known in the art—that is to say, the movable contacts, in the nature of metal strips, are supported upon a controller-drum and the stationary contact-brushes are connected to the main resistance in the usual way with the blow-out coil BO so disposed in a well-known manner for disrupting the arcs at the contacts, the contact-strips $l'$ $l^2$ $l^3$ $l^4$ being disposed at one end of the cylinder and the stationary contact-brushes $t^4$ $t^5$ $t^6$ $t^7$ connected, respectively, to the controlling-conductors $y^4$ $y^5$ $y^6$ $y^7$, the latter circuit, however, running directly to the solenoid $C^5$, which controls the movement of the main valve V'.

With the understanding that the relation of the controlling-circuits to the adaptation of the movement of the main operating device is as illustrated and not materially different from that disclosed in the preferred form of the invention (shown in Fig. 1) it is believed that the operation of the modified form will be fully understood, except that I will describe the operation of the magnet $m$ in the primary or master controller, the object of which is to draw the contact $c$ away from its contact A or B on the controller-drum CD until the motor-circuit combiner MR is in its proper position for forward or reverse running of the car, after which the circuit operating the motor-circuit combiner is interrupted at $p$ or $p'$ on the drum of the combiner. Then contact $c$ drops to its place on the contacts A or B, throwing potential on the contact $d$, after which the running positions are effected in precisely the same manner as were the like positions disclosed in Fig. 1 of the drawings.

I do not limit my invention to the numerous details of construction illustrated in the accompanying drawings and hereinbefore described, as a number of the features thereof might be materially departed from and still come within the scope of my claims hereinafter made; nor, as before stated, do I limit its use to the specific structural use illustrated in the accompanying drawings, as obviously the same may be applied in connection with systems of electrical energy generally where it is designed to utilize electric motors at relatively widely separated points from the point of control, and I wish it understood that my claims hereinafter made are designed to include all such uses; nor do I limit the numerous details hereinbefore described to specific use in connection with the combined system, as a number of the same might be utilized in connection with systems of motor control generally. To illustrate, the manner of locking the primary or master controller temporarily in a definite position might be utilized with controllers of well-known form, and the arrangement of rotary and stationary contacts disclosed in Figs. 1, 2, and 3 of the drawings when combined with a main resistance and blow-out coil might be utilized in systems of electrical energy generally, and I desire it understood that my claims are to be designed to be of such scope as to include all such uses. I also desire it understood that while I have shown my means of motor control as applicable to two motors of the series type I do not wish to be limited specifically to this combination, as the same might be applied to any number of motors and numerous features of the entire structural apparatus illustrated in the accompanying drawings and hereinbefore described might be utilized with any type of electric motor, either direct of alternate, my invention being generic in many respects. It is of course obvious that numerous details in the nature of hand-switches and safety appliances—such as fuses, circuit-breakers, &c.—are purposely left out of the drawings, and particularly out of Figs. 1 and 20, so as to avoid confusion.

No claim is made hereinafter to the modified form of the master-controller illustrated in Figs. 15, 16, and 17, nor to the modified form of the main operating device illustrated in Figs. 18 and 19, nor to the modified form of the complete system illustrated in Fig. 20, in which the aforesaid modified forms of master-controller and main operating device are embodied, as these features constitute the subject-matter of a divisional application filed by me in the United States Patent Office on the 27th day of June, 1905, bearing Serial No. 267,204.

Having thus described my invention, what I claim, and desire to secure by Letters Patent of the United States, is—

1. In a system of motor control a main controller, one or more motors, a master-controller, and a main operating device having hydraulic and electric means for governing its operation through successive steps so that it is held in the step indicated at the master-controller; in combination with circuits and circuit connections, substantially as described.

2. In a system of motor control for two or more motors, a master-controller, a main operating device having hydraulic and electric means for so governing its operation through successive steps that it may be held in any of these steps as indicated at the master-controller, and means for varying the current through the motors; in combination with circuits and circuit connections, substantially as described.

3. A system of motor control embracing a main controller provided with means for varying the electrical effect upon the motors; in combination with a portable master-controller having means for preventing its removal from its support without first interrupting all circuit connections through it, and circuits and circuit connections, substantially as described.

4. A system of motor control embracing two sets of conductors, one adapted to carry currents of relatively small volume and the other the working currents; in combination with a main controller adapted to manipulate the working currents, and a main operating device in the form of a solenoid having a single energizing-coil adapted to move the core thereof thus effecting the manipulation of the main controller; together with a portable master-controller so arranged that it cannot be removed from its support without first having interrupted the circuit connections through the said conductors carrying currents of relatively small volume, substantially as described.

5. In a system of motor control a main operating device embracing electric means for advancing its operative parts by gradual successive steps, and hydraulic means for retarding said parts and for maintaining them in any desired position; in combination with a master-controller which indicates at all times the position of the said main operating device, substantially as described.

6. In a system of motor control a main operating device embracing means for advancing its operative parts by gradual successive steps, and hydraulic and electric means for maintaining them in any desired position; in combination with means for indicating this position, substantially as described.

7. In a system of motor control a main operating device embracing hydraulic means adapted to permit the gradual and successive advancement of the operative parts thereof through their range of movement; together with means for maintaining said parts in any desired position, and additional means for restoring said parts to normal; in combination with means for indicating the position of the operative parts of the said main operating device, substantially as described.

8. In a system of motor control a main controller and a main operating device operatively connected thereto; a source of energy for advancing the movable parts of the operating device at a predetermined speed through successive steps in one direction, and hydraulic means for retarding said parts as they advance; in combination with an additional source of energy for returning them to normal or "off" position, and independent means for showing the step the said movable parts of the main operating device is in, substantially as described.

9. In a system of motor control a main controller and a main operating device operatively connected thereto; in combination with a master-controller and electrical connections between all of said parts; a source of energy for advancing the movable parts of the operating device at a predetermined speed through successive steps in one direction, and fluid means for retarding said parts as they advance, the position of the movable parts in any of the said steps being indicated at the master-controller; together with an additional source of energy for returning them to normal or "off" position, substantially as described.

10. In a system of motor control a main operating device embracing a cylinder and piston operated and controlled in its movements in one direction by electrical and hydraulic means, and in reverse direction by a constantly-acting force; in combination with means for checking or holding it in any desired position, said position being controlled by means electrically connected to the main operating device, substantially as described.

11. In a system of motor control a main power-impelled operating device operatively connected to the controller and provided with hydraulic means for preventing the movement of the controller faster than a predetermined speed, the position of the controller at any time being indicated and controlled by means independent to it or the operating device, substantially as described.

12. In a system of motor control a main operating device operatively connected to the controller and provided with adjustable hydraulic means for effecting the movement of the controller at predetermined speeds, through definite positions, said positions being indicated and controlled by means electrically connected to the main operating device and the controller, but operated independently thereto, substantially as described.

13. In a system of motor control a main electromagnetic operating device connected to the controller, said operating device being provided with retarding means for limiting its rate of speed, and additional electrically-controlled adjusting means for effecting a predetermined rate of speed thereof through different positions; in combination with means for indicating at which one of the definite positions the said main operating device is being held, substantially as described.

14. In a system of motor control a portable master-controller embracing means for preventing its removal from its support without first interrupting all circuit connections through it, a single main operating device having fluid-controlled parts, a single main controller, a motor-circuit combiner, and circuit connections, substantially as described.

15. In a system of motor control a master-controller embracing means for preventing its adjustment to its seat without first opening all circuit connections through it, a single main operating device provided with hydraulic controlling means, a single main controller, and a motor-circuit combiner so interconnected electrically and mechanically that the motors may be electrically connected to the source of current-supply in any desired relation, substantially as described.

16. In a system of motor control for electric-railway cars a series of control-circuits on each car and interconnecting current contacts and conductors; a single portable master-controller adapted to be utilized on any car and embracing means for preventing its adjustment to or removal from its seat without first opening all circuit connections through it; in combination with a main controller for each car and mechanical and electrical connections between the same and the motors thereof, whereby a motorman may control the movements of a train from any car with the portable master-controller, substantially as described.

17. A railway-car provided with a series of control-circuits having duplicate sets of stationary contacts at different positions on the car; in combination with a master-controller adapted to be transferred to either of said positions and connected in circuit with the stationary contacts, said controller being provided with means for preventing its removal from its seat without first interrupting all circuit connections through it; together with a main controller, a main operating device provided with hydraulically-controlled means, said device being so controlled by the master-controller that the position of its main operating-handle always indicates the corresponding position of the main operating device, and mechanical and electrical connections between said parts and the motor or motors, whereby the car may be operated by the master-controller from either position, substantially as described.

18. In a system of motor control a series of motors individually located at different points relatively at considerable distances apart; a main controller for each motor or pair of motors; a single main operating device for each controller provided with hydraulically-controlled means; a multiple series of control-conductors running to different points of control; in combination with a single portable master-controller adapted to be utilized at any point of control and indicating at all times the position of the main controllers, and a series of working conductors adapted to carry the working current through any of the motors, substantially as described.

19. In a system of motor control electric motors located in pairs at points relatively at considerable distances apart, each pair of motors having a series-parallel motor-combiner, a single main controller, and a single main operating device provided with hydraulically-controlled means therefor; in combination with independent sets of control-circuits, one set for each pair of motors and a single portable master-controller adapted to be used at points of control relatively separated as to distance, whereby any pair of motors may be utilized as desired, the said master-controller embracing means for indicating at all times the position of the main controllers, substantially as described.

20. In a system of motor control contacts for conveying currents of relatively large volume carried by an arm of magnetic material;

a rotary shaft supporting said arm; a contact-strip carried thereby, and circuit connections between said strip and the aforesaid arm through which the motor-current flows; in combination with stationary contacts and a blow-out coil so disposed with relation to the arm and the contacts that magnetic lines of force established through the arm and at the points of rupture will blow out any arc established between the movable and stationary contacts, substantially as described.

21. In a system of motor control a main resistance divided into sections, said sections being connected to stationary contacts disposed in circular relation around a rotary arm of magnetic material carrying contacts adapted to contact with the stationary contacts, stationary contacts being arranged with relation to the movable contacts in such manner that the contact at one end of the arm is broken after contact at opposite end of the arm is made; then the latter contact is broken after the former is again made, and so on during the rotation of the arm; in combination with a blow-out coil adapted to establish magnetic lines of force through the arm and the air-spaces between the stationary and movable contacts, substantially as described.

22. In a system of motor control a sectional main resistance connected by conductors to stationary contacts circularly disposed; in combination with a rotatable arm carrying one or more pairs of contacts electrically connected together, the arrangement being such that the circuit is never wholly broken between one of the rotary contacts and its fellow stationary contact before it is reëstablished between the other rotary contact and a second stationary contact, except after the entire resistance has been cut out, whereby damaging arcing is prevented, substantially as described.

23. In a system of motor control a series of stationary contacts circularly disposed and connected to sectional parts of the main resistance; in combination with a rotary arm carrying yielding contacts at its opposite ends, said contacts being yieldingly seated in rigid supports at the ends of the rotary arm, the arm with its contacts constituting a rotary terminal through which current is led to the stationary contacts, substantially as described.

24. In a system of motor control a series of stationary terminals having adjustable contact-plates electrically connected to the sections of the main resistance; in combination with a rotary arm carrying contacts at its opposite ends, said contacts being yieldingly supported so that when the arm is rotated the circuit is never actually broken between the contacts, until after the resistance has been passed through, substantially as described.

25. In a system of motor control an operating device embracing a cylinder and a piston therein, said piston constituting a solenoid-core connected to the main controller and adapted to move or rotate the same through fixed positions, means being afforded whereby the controller may be held in any of said fixed positions; in combination with a source of liquid-supply; valve mechanism; a main controlling-solenoid and circuits and circuit connections, whereby the controller may be moved gradually and in such manner as to prevent or avoid sudden abnormal current-flow through the motor or motors, substantially as described.

26. In a system of motor control means for effecting the various current relations to and through the motor or motors; in combination with hydraulic means controlled by said current for maintaining it at a predetermined or fixed maximum value during the starting of the motor or motors, substantially as described.

27. In a system of motor control means for varying the current-flow to and through the motors; in combination with hydraulic means controlled by said current and adapted to react on the first-named means in such manner as to automatically maintain the current-flow at a predetermined or fixed maximum value during the starting of the motors, and also not to allow this fixed maximum value to be exceeded during the operation of the motors, substantially as described.

28. In a system of motor control a controller adapted to effect the desired current changes through the motors; in combination with hydraulic means adapted to automatically establish a rate of movement of the controller, whereby the motors are caused to exert a practically constant torque on starting and also which does not allow this starting torque to be exceeded during the operation of the motors, substantially as described.

29. In a system of motor control a controller adapted to effect the desired current changes through the motors; in combination with adjustable hydraulic means adapted to automatically establish a rate of movement of the controller, whereby the motors are caused to exert a practically constant torque on starting which may be varied at will by such adjustment, substantially as described.

30. In a system of motor control for electric railways a main controller for each car and a portable master-controller having electrical connections with each main controller; in combination with automatically-controlled fluid means connected with each main controller for effecting a practically constant flow of current during the starting of the motors, substantially as described.

31. A controller provided with a series of controller-contacts and means for connecting it temporarily to a stationary support; and additional means for preventing its removal without first interrupting all circuit connections through it; in combination with a series of control-conductors having stationary contacts adapted to be connected with the controller-contacts, substantially as described.

32. A controller provided with a controller-handle and means for securing it, the controller, temporarily to a permanent support, the arrangement being such that the controller can only be detached when the controller-handle is in "off" position or the circuit to the source of current-supply interrupted, substantially as described.

33. A portable controller having operating and reversing means and means for detachably securing it temporarily to a permanent support; together with locking means for preventing its removal when the operating-handle is in any position other than "off," substantially as described.

34. A portable controller having reversing and operating contacts and independent operating-handles therefor; in combination with means for temporarily securing it to a permanent support, and additional means for locking it thereto, the arrangement being such that it cannot be detached until both handles are in indicated "off" positions and the working circuit disrupted, substantially as described.

35. In a system of motor control of the series-parallel type, means for effecting the series and parallel relations which operate only when these relations are being made; in combination with additional means independent of the first-named means which disrupt the motor-circuit after the different series combinations have been passed through, and restores said circuit again after the parallel relations have been established, substantially as described.

36. In a system of motor control of the series-parallel type means for effecting the series combinations; independent means for changing the amount of resistance in circuit and for disrupting the working current after the series changes have been completed; in combination with means for effecting the parallel combinations, and additional independent means for again throwing in the whole resistance after paralleling, and then successively cutting it out as the paralleling proceeds, the rate at which the resistance is cut out being independent of the operator and depending on the amount of current flowing in the motor-circuit, substantially as described.

37. A system of motor control for an electrically-propelled car embracing a series of insulated controlling-conductors adapted to carry controlling-currents of relatively small volume and a series of insulated working conductors adapted to carry working currents of relatively large volume; in combination with a master-controller, a main controller, and an operating device embracing hydraulic means for advancing it through definite steps, said device being adapted to manipulate the main controller, said main controller and the operating device being electrically and mechanically connected together, substantially as described.

38. A system of motor control embracing an automatic operating device including hydraulic controlling means, said device being operatively connected to a controller, and a motor-combiner adapted to effect series-parallel combinations; in combination with means for automatically varying the motor resistance, said means tending to keep the motor-current constant during starting, substantially as described.

39. In a system of motor control means for establishing series and parallel relations of the motors; in combination with additional independent means for interrupting the motor-circuit after the different series combinations of the motors have been made and before the parallel relations have been established, the first-named means never interrupting current in the motor-circuit and operating only while the series or parallel relation is being established, the said means for interrupting the motor-circuit operating automatically, its speed of operation depending on the value of the motor-current, substantially as described.

40. A system of motor control embracing a main controller, a main resistance and resistance-varying means; in combination with a main operating device and a motor-circuit combiner for effecting the series and parallel relations of a pair of motors; together with a master-controller provided with means for controlling the movements of the main operating device, the movable driving part of the latter being operated by two sources of power and retarded in one direction by hydraulic means, substantially as described.

41. In a system of motor control of the series-parallel type, electrically-controlled means for maintaining the maximum current-flow to the motors the same, whether the motors be running in series or parallel, in combination with a master-controller having circuit connections with said means, substantially as described.

42. In a system of motor control of the series-parallel type means embracing hydraulically-controlled parts for operating the controller at one speed while the series or parallel combinations are being effected and for materially increasing the speed thereof while passing from series to parallel combinations, both speeds being governed by the current flowing in the motor-circuit, substantially as described.

43. In a system of motor control of the series-parallel type an operating device operated by two opposing sources of energy, and hydraulic means all so constructed and controlled that the series and parallel combinations are effected at substantially one speed and that the speed is materially increased between the times of effecting such series and the parallel combinations, both speeds being governed by the current flowing in the motor-circuit, substantially as described.

In testimony whereof I have signed my name to this specification in the presence of two subscribing witnesses.

CHARLES A. MUDGE.

Witnesses:
C. J. KINTNER,
M. F. KEATING.